(12) United States Patent
Ciris

(10) Patent No.: US 12,112,442 B2
(45) Date of Patent: Oct. 8, 2024

(54) SYSTEMS AND METHODS TO INSERT SUPPLEMENTAL CONTENT INTO PRESENTATIONS OF TWO-DIMENSIONAL VIDEO CONTENT

(71) Applicant: 4D Sight, Inc., San Francisco, CA (US)

(72) Inventor: Erhan Ciris, Istanbul (TR)

(73) Assignee: 4D Sight, Inc., San Francisco, CA (US)

( * ) Notice: Subject to any disclaimer, the term of this patent is extended or adjusted under 35 U.S.C. 154(b) by 0 days.

(21) Appl. No.: 18/322,432

(22) Filed: May 23, 2023

(65) Prior Publication Data

US 2023/0298289 A1    Sep. 21, 2023

Related U.S. Application Data

(63) Continuation of application No. 17/670,238, filed on Feb. 11, 2022, now Pat. No. 11,704,882, which is a continuation of application No. 17/334,526, filed on May 28, 2021, now Pat. No. 11,270,517.

(51) Int. Cl.
| | |
|---|---|
| *G06T 19/00* | (2011.01) |
| *G06N 20/00* | (2019.01) |
| *G06T 7/73* | (2017.01) |
| *H04N 21/234* | (2011.01) |
| *H04N 21/81* | (2011.01) |

(52) U.S. Cl.
CPC .......... *G06T 19/006* (2013.01); *G06N 20/00* (2019.01); *G06T 7/73* (2017.01); *H04N 21/23424* (2013.01); *H04N 21/8146* (2013.01); *H04N 21/816* (2013.01)

(58) Field of Classification Search
None
See application file for complete search history.

(56) References Cited

U.S. PATENT DOCUMENTS

| | | |
|---|---|---|
| 2006/0195866 A1 | 8/2006 | Thukral |
| 2010/0030639 A1 | 2/2010 | Feng |
| 2013/0031582 A1 | 1/2013 | Tinsman |
| 2013/0141530 A1* | 6/2013 | Zavesky ............... G06T 19/20 348/43 |
| 2013/0247080 A1 | 9/2013 | Vinson |
| 2016/0117722 A1 | 4/2016 | Garcia |
| 2016/0314593 A1* | 10/2016 | Metzler ................ G06T 7/73 |
| 2019/0075339 A1 | 3/2019 | Smith |
| 2019/0102792 A1 | 4/2019 | Candiotti |

(Continued)

*Primary Examiner* — Ryan M Gray
(74) *Attorney, Agent, or Firm* — Esplin & Associates, PC

(57) ABSTRACT

Systems and methods for inserting supplemental content into presentations of two-dimensional video content are disclosed. Exemplary implementations may: obtain two-dimensional video content depicting a three-dimensional space; obtain supplemental content; obtain a model of the three-dimensional space defining the one or more visible physical features within the three-dimensional space; determine the camera position of the two-dimensional video content; identify a presentation location within the two-dimensional video content; determine integration information; modify the two-dimensional video content to include the supplemental content at the identified presentation locations in accordance with the integration information and/or perform other operations.

20 Claims, 4 Drawing Sheets

(56) References Cited

U.S. PATENT DOCUMENTS

| | | | |
|---|---|---|---|
| 2019/0147619 A1* | 5/2019 | Goldman | G01B 11/245 |
| | | | 382/154 |
| 2019/0174170 A1 | 6/2019 | Chen | |
| 2020/0074739 A1* | 3/2020 | Stauber | G06F 3/011 |
| 2020/0090375 A1 | 3/2020 | Mori | |
| 2020/0111267 A1* | 4/2020 | Stauber | G06F 3/011 |
| 2022/0360827 A1 | 11/2022 | Kawakami | |
| 2024/0087247 A1* | 3/2024 | Edwards | G06T 11/60 |

* cited by examiner

SYSTEMS AND METHODS TO INSERT SUPPLEMENTAL CONTENT INTO PRESENTATIONS OF TWO-DIMENSIONAL VIDEO CONTENT

FIELD OF THE DISCLOSURE

The present disclosure relates to determining content placement within presentations of two-dimensional video content.

BACKGROUND

Streaming of two-dimensional video content is known. Streaming may be used to deliver continuous video content over a network, from a source to a destination, using minimal intermediate network storage. Current solutions to insert supplemental content into streamed video content requires complex content level integration, third-party plugins, or specialized cameras, and therefore are costly and time inefficient.

SUMMARY

One aspect of the present disclosure relates to inserting supplemental content into presentations of two-dimensional video content. The insertion of the supplemental content may be made as the two-dimensional video content is being streamed over a network. The supplemental content may be inserted into the video content to appear as though it was pre-existing graphical content on one or more surfaces in the video content. The video content may be computer generated and/or live-action. The surface(s) on which the supplemental content is inserted may be computer generated and/or present in the real world. The insertion of supplemental content into presentations of video content may be used to provide supplemental messaging to viewers of the video content and/or for other purposes.

The system configured to insert supplemental content into presentations of two-dimensional video content may include one or more of electronic storage, one or more hardware processors, and/or other components. The electronic storage may be configured to store information. The stored information may include one or more machine learning algorithms that are ready to be executed, models of three-dimensional spaces, and/or other information. The one or more hardware processors may be configured to execute one or more computer processing components. The one or more computer processing components may include one or more of a content component, a model component, a camera component, an integration component, a modification component, and/or other components.

The content component may be configured by machine readable instructions to obtain two-dimensional video content. The two-dimensional video content may depict a view of a three-dimensional space and/or include and/or depict other content. The view of the three-dimensional space may include one or more visible physical features and/or other three-dimensional features and/or objects present in the three-dimensional space. The view may include a field of view that defines the area of the three-dimensional space that is observable to the viewer of the two-dimensional video content. The field of view of the three-dimensional space may be determined by a camera position in the three-dimensional space. The camera position may include one or more of a point of view, a capture angle, and/or other information. The point of view of the camera position may define the position (e.g., X-Y-Z coordinates) of a camera lens in the three-dimensional space. The capture angle may define the tilt and/or rotation of the camera lens relative to a coordinate system of the three-dimensional space. The content component may be further configured to obtain supplemental content and/or other content. The supplemental visual content may include supplemental visual content such as video content, image content, and/or other visual content. The supplemental content may be inserted into the two-dimensional video content.

The model component may be configured by machine readable instructions to obtain a model of the three-dimensional space, and/or other information, and/or content. The model of the three-dimensional space may define the one or more visible physical features within the three-dimensional space and/or other information pertaining to the three-dimensional space. The one or more visible physical features may be defined by one or more of relative position to a coordinate system of the three-dimensional space, relative position to other physical features in the three-dimensional space, relative size and/or scale, and/or other information. Information defining the one or more visible physical features may be stored and/or included in the model. In some implementations, the model may be obtained from the one or more machine learning algorithms stored in electronic storage. The one or more machine learning algorithms may use the obtained two-dimensional video content to generate the model. In some implementations, the model may be obtained from the user and/or inputted by the user. The model may be predetermined prior to being obtained and may be generated based on the obtained two-dimensional video content and/or other video content depicting the three-dimensional space.

The camera component may be configured by machine readable instructions to determine the camera position in the three-dimensional space. The camera position may be determined by comparing the depiction of the one or more visible physical features in the two-dimensional video content with the one or more one or more visible physical features defined in the model and/or other methods. The comparison may be used to extrapolate the camera position and/or other information. Extrapolation of the camera position may include calculations of the point of view, the capture angle, and/or other information.

The integration component may be configured by machine readable instructions to identify a presentation location in the two-dimensional video content. The presentation location may have a surface in the three-dimensional space. The surface may be suitable for presentation of supplemental visual content and/or other content. The surface may be identified as suitable presentation location based on one or more of the surface size, surface texture, visibility in the two-dimensional video content depiction of the three-dimensional space, and/or other information. The integration component may be further configured by machine-readable instructions to determine integration information for the supplemental visual content and/or other information. The integration information may be based on the camera position, the identified presentation location, the two-dimensional video content, the model of the three-dimensional space, and/or other information. The integration information may include one or more of scaling information, three-dimensional rotational position for the supplemental visual content, and/or other information.

The modification component may be further configured by machine readable instructions to modify the two-dimensional video content. The two-dimensional video content may be modified to include the supplemental visual content and/or other content. The supplemental visual content may be included in the two-dimensional video content at the identified presentation locations and/or other locations. The supplemental visual content may be included in the two-dimensional video content in accordance with the integration information and/or other information. In some implementations, the supplemental visual content may appear to be present in the two-dimensional video content on the surface of the identified presentation location.

As used herein, any association (or relation, or reflection, or indication, or correspondency) involving servers, processors, client computing platforms, software applications, two-dimensional video content, three-dimensional spaces, visible and/or non-visible physical features, visual content, views, fields of view, positions, angles, versions, steps, formats, selections, determinations, comparisons, analyses, improvements, reductions, presentations, notifications, user interfaces, user interface elements, portions, fields, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "determine" (and derivatives thereof) may include measure, calculate, compute, estimate, approximate, extract, generate, and/or otherwise derive, and/or any combination thereof. As used herein, the term "identify" (and derivatives thereof) may include recognize, established, derive, confirm, verify, connect, confirm, include, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
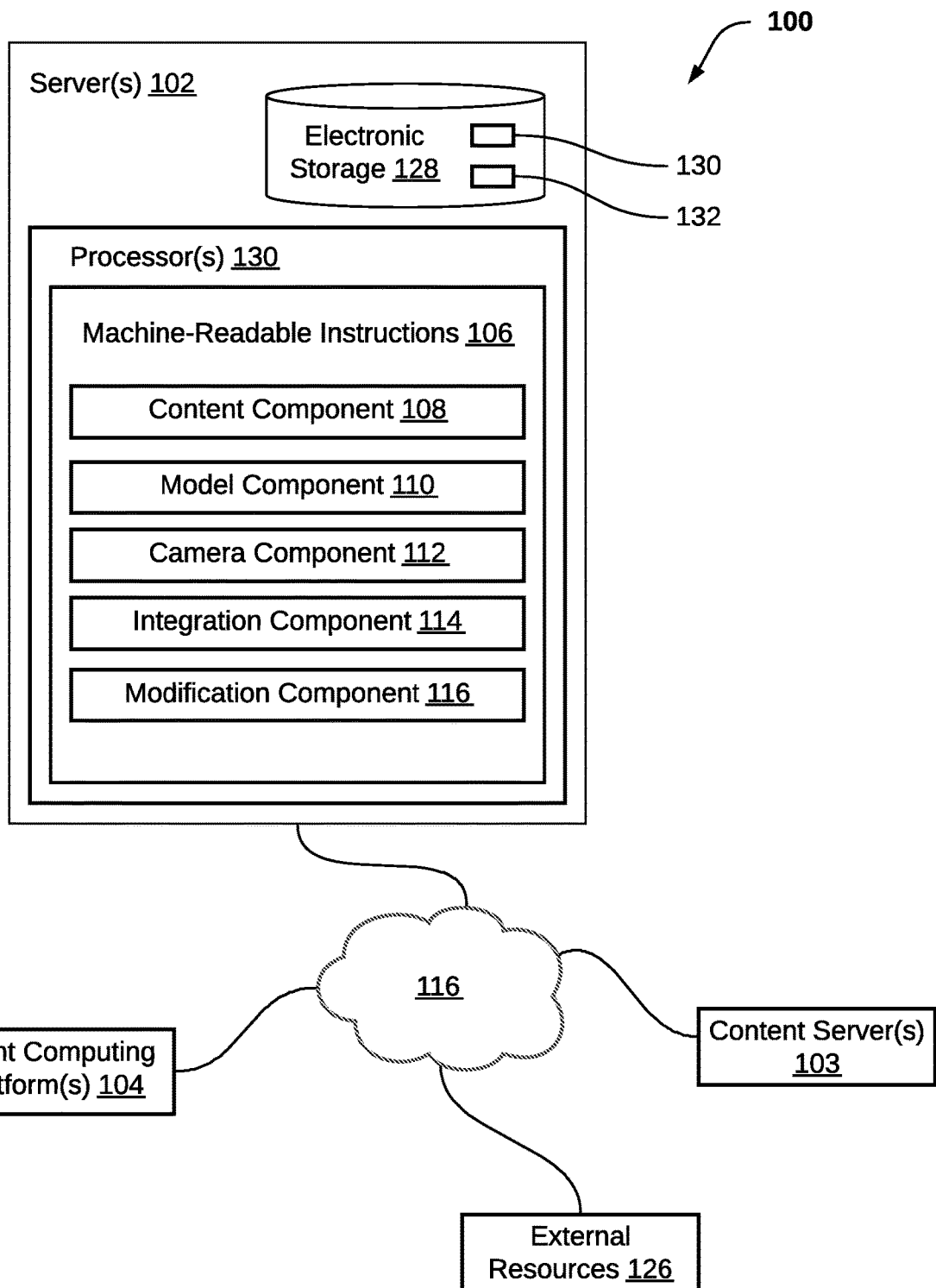
FIG. 1 illustrates a system configured to insert supplemental content into presentations of two-dimensional video content, in accordance with one or more implementations.

FIG. 1 illustrates a system 100 configured to insert supplemental content into presentations of two-dimensional video content, in accordance with one or more implementations. Current solutions for embedding advertisement content and/or other content into videos may be inefficient and/or require additional software and/or hardware components. Embedding visual content and/or other content into videos for streaming is common for sporting video content and electronic-sporting (i.e. e-sporting) video content. Video content may require content level integration and/or content specific solutions in order for visual content and/or other content placement to be determined and/or to be accurately inserted. One or more implementations presented herein may facilitate inserting supplemental content into presentations of two-dimensional video content in a more efficient manner than solutions that are currently available.

As used herein, two-dimensional video content may simple be referred to as a video and/or video content. The video content may include audio content, visual content, and/or other content. Two-dimensional video content may refer to the dimensionality of the visual content. For example, two-dimensional visual content representing a three-dimensional space may be referred to as two-dimensional video content. In some implementations, the video may be one or more of a live video, a pre-recorded video, and/or other types of videos. In some implementations, a live video may relay content that is happening in real-time or near real-time to the video content viewer and/or during production of the video. In some implementations, the video may be optimized to be streamed via one or more video streaming platforms and/or other presentations platforms.

Referring to FIG. 1, in some implementations, system 100 may include one or more server(s) 102, one or more content server(s) 103, one or more client computing platforms 104, external resources 126, user interface(s) 300 and/or other components. Server(s) 102 may be configured to communicate with one or more client computing platforms 104 according to a client/server architecture and/or other architectures. Client computing platform(s) 104 may be configured to communicate, through one or more networks 116, with other client computing platforms via server(s) 102 and/or according to a peer-to-peer architecture and/or other architectures. Users may access system 100 via client computing platform(s) 104.

Server(s) 102 may include one or more of non-transitory electronic storage 128, one or more processors 130 configured by machine-readable instructions 106, and/or other components. The non-transitory electronic storage 128 may store one or more machine learning algorithms 130, one or more models 132, and/or other information. Machine-readable instructions 106 may include one or more instruction components. The instruction components may include computer program components. The computer program components may include one or more of a content component 108, a model component 110, an integration component 112, a modification component 114, and/or other components. Executing the machine-readable instructions 106 may cause server(s) 102 to insert supplemental content into presentations of two-dimensional video content. In some implementations, supplemental content may inserted into presentations of two-dimensional video content during streaming of the two-dimensional video content from a source server to a destination server. Insertion of supplemental content may be done in real-time or near real-time during streaming of the two-dimensional video content. Streaming of two-dimensional video content can be achieved by delivering the video content directly from the source server to the destination server. Streaming of two-dimensional video content may also be achieved by delivering the video content from the source server to one or more intermediate servers, then from the one or more intermediate servers to the destination server. In some implementations, the two-dimensional video content may be received by server 102 from the source server that may be included in the one or more content server(s) 103. After two-dimensional video content is received by server 102, the one or more computer program components may modify the two-dimensional video content to insert supplemental content. The modified two-dimensional video content may then be outputted by server 102 to the destination server that may be included in the one or more content server(s) 103. In some implementation, server 102 may be an intermediate server in the process of streaming the two-dimensional video content from the source server to the destination server.

Content component 108 may configured to obtain two-dimensional video content. In some implementations the two-dimensional video content may be one or more of a live video, a pre-recorded video, a video stream, and/or other types of video content. In some implementations, the two-dimensional video content may be one or more of a .MOV, .MP4, .MPEG-4, .WMV, .AVI, and/or other video file formats. The two-dimensional video content may be optimized for streaming and/or have other optimization features. The two-dimensional video content may depict a view of a three-dimensional space. The three-dimensional space may represent one or more of a sporting arena, a gaming environment, a real-world environment, a digital environment, and/or other types of three-dimensional spaces. The two-dimensional video content may depict a view of the three dimensional space. In some implementations, the view of the three-dimensional space may change based on the progress through the video content. Progress through the video content may be defined by a start of the video content, an end of the video content, a time duration of the video content, and/or other information. The view may include one or more visible physical features and/or other features present in the three-dimensional space. In some implementations, visible physical features may include stationary objects, mobile objects, ground planes and/or surfaces, aerial spaces, and/or other features present in the three-dimensional space.

Figure 4:
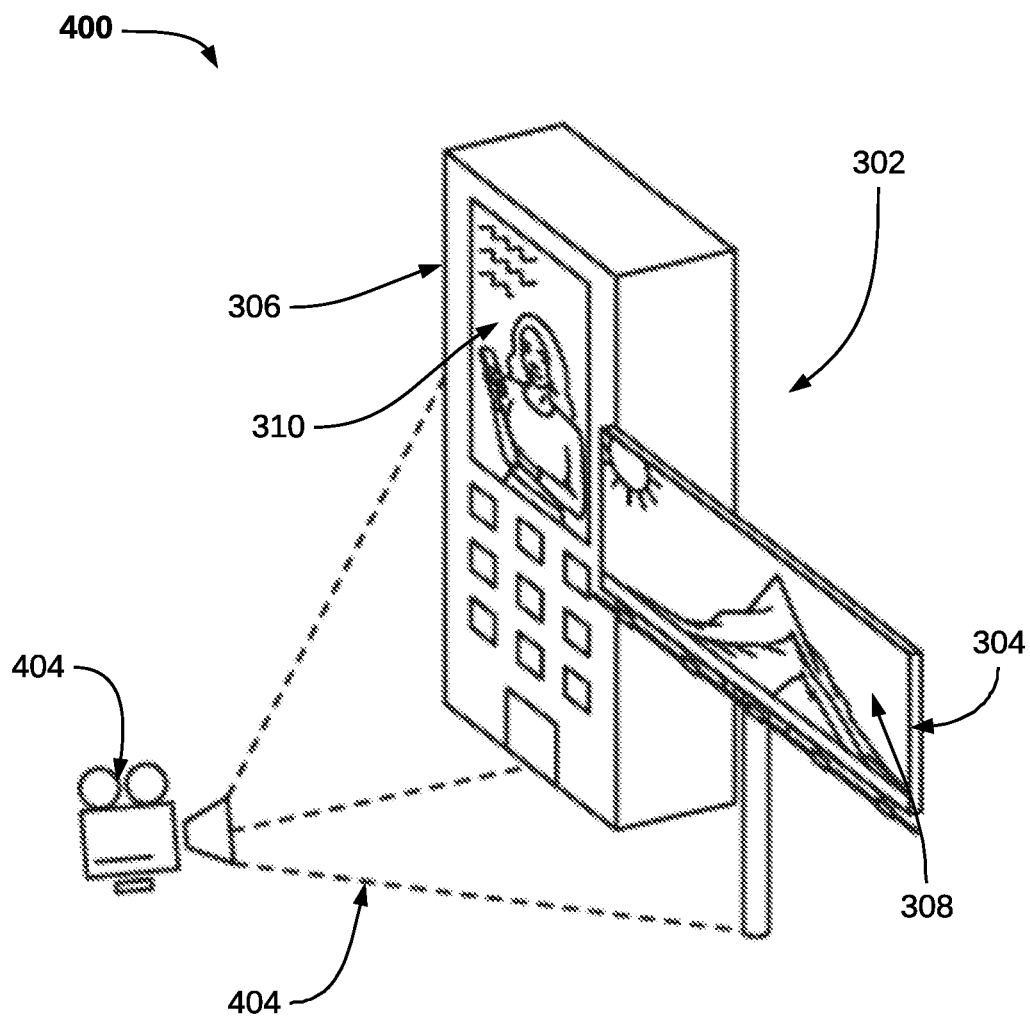
FIG. 4 illustrates an exemplary model of a three-dimensional space that may be used in a system configured to insert supplemental content into presentations of two-dimensional video content, in accordance with one or more implementations.

The view may include a field of view that may be determined by a camera position and/or other information. The camera position may include one or more of a point of view, a capture angle, and/or other information. The point of view of the camera position may define the position (e.g., X-Y-Z coordinates) of a camera lens in the three-dimensional space. The capture angle may define the tilt and/or rotation of the camera lens relative to a coordinate system of the three-dimensional space. Referring to FIG. 4, a model 400 is shown. Model 400 may define a three-dimensional space 302. The three-dimensional space 302 may include one or more of a first visible physical feature 306, a second visible physical feature 304, a camera position 402 (depicted as a camera icon), and/or other components. Camera position 402 may define a field of view 404 (depicted as an area bound by dashed lines extending from the camera icon). Camera position 402 may include a point of view, a capture angle, and/or other information. The point of view of the camera position may define the position (e.g., X-Y-Z coordinates) of a camera lens in three-dimensional space 302. The capture angle may define the tilt and/or rotation of the camera lens relative to the coordinate system of three-dimensional space 302. The field of view 404 may define the area of three-dimensional space 302 that is observable to the viewer of the two-dimensional video content. The field of view 404 and/or the camera position 402 may change based on the progress through the two-dimensional video content that depicts three-dimensional space 302. For example, the point of view of camera position 402 may move from a first X-Y-Z coordinate in model 400 to a second X-Y-Z model coordinate in model 400, such that the first coordinate is different from the second coordinate. A change in point of view of camera position 402 from the first coordinate to the second coordinate may effectuate a change in field of view 404. Camera position 402 may change such that the capture angle may pan and/or tilt in one or more directions. For example, the capture angle of camera position 402 may change by panning up, down, to the right, to the left, and/or other directions and/or combination of directions. The capture angle of camera position 402 panning and/or tilting may effectuate a change the field of view 404.

Referring back to FIG. 1, content component 108 may be configured to obtain supplemental content. The obtained supplemental content may include supplemental visual content, such as video content, image content, and/or other visual content. The supplemental video content may have a format that is one or more of a .MOV, .MP4, .MPEG-4, .WMV, .AVI, .JPEG, .PDF, .TIFF, .GIF, and/or other file formats. The supplemental visual content be configured to be inserted into the two-dimensional video content. By way of non-limiting example, supplemental content may include one or more of advertisements, wayfinding markers, scoreboards, environment enhancing graphics, and/or other information and/or other content. In some implementations, supplemental content obtained for a first user of system 100 may be different than supplement content obtained for a second user of system 100. Supplemental content may be selected by the user and/or may be determined by one or more of machine learning algorithms 130 stored in electronic storage 128, and/or other methods of determination and/or obtaining supplemental content. Supplemental content that is obtained may be different based on one or more of the subject matter of the video content, the genre of the video content, the target audience of the video content, and/or other information pertaining to the video content. For example, two-dimensional video content depicting a video game recording may obtain supplemental content that is different than the supplemental content obtained for two-dimensional video content depicting a real-world sporting event.

Model component 110 may be configured to obtain a model of the three-dimensional space. The model may be one or more of a mathematical coordinate-based representation of a three-dimensional space, a collection of three-dimensional data points related by a coordinate system, and/or other three-dimensional digital structures. The model may define the one or more visible physical features in the three-dimensional space. The one or more visible physical features may be defined by one or more of relative position to a coordinate system of the three-dimensional space, relative position to other physical features in the three-dimensional space, relative size and/or scale, and/or other information. Information defining the one or more visible physical features may be stored and/or included in the model. In some implementations, the model may be based on the obtained two-dimensional video content and/or other video content depicting the same three-dimensional space. The one or more visible physical features that are defined in the model may be the same as/or similar to the one or more visible physical features depicted in the view of the two-dimensional video content. In some implementations, obtaining the model may include one or more of accessing a previously stored model 132, determining the model, receiving the model from an external source (e.g., a source of the video content), updating a previously determined and/or stored model, and/or other mechanisms for obtaining the model.

In some implementations, the model of the three-dimensional space may be obtained via one or more machine learning algorithms and/or other methods. The one or more machine learning algorithms 130 may be stored using electronic storage 128. In some implementations, the one or more machine learning algorithms 130 may be configured to use the obtained two-dimensional video content to generate the model of the three-dimensional space. In some implementations, the one or more machine learning algorithms 130 may receive the two-dimensional video content and/or other video content depicting the same three-dimensional space as input to be analyzed, scanned, mapped, and/or other methods of processing the two-dimensional video content. The one or more machine learning algorithms 130 may extract information pertaining to the three-dimensional space depicted in the two-dimensional video content. The extracted information may be used to generate the model, may be stored in the model, and/or may be used to enhance an existing model. In some implementations, obtaining a model through one or more stored machine learning algorithms may occur simultaneously or in real-time to the streaming of the two-dimensional video In some implementations, the model of the three-dimensional space may be obtained from the user. The model of the three-dimensional space may be predetermined prior to being obtained and/or stored in electronic storage 129. The model may be predetermined and/or constructed manually by the user, by one or more external machine learning algorithms, by one or more scanning techniques, and/or scene mapping of one of more two-dimensional video contents, and/or other methods. The predetermined model of the three-dimensional space may be based on the obtained two-dimensional video content and/or other video content depicting the same three-dimensional space. In some implementations, the predetermined model may include one or more of identified presentation locations, integration information, and/or other information. In some implementations, the predetermined model may be obtained in real-time and/or simultaneously to the streaming of the two-dimensional video.

Camera component 112 may be configured to determine the camera position of the two-dimensional video content. The camera position may be determined by comparing information pertaining to the depiction of the one or more visible features in the two-dimensional video content with information pertaining to the one or more one or more visible features defined in the model. The comparison may be used to extrapolate the camera position. In some implementations, camera component 112 may use the position of one or more visible physical features in the three-dimensional space to perform comparisons against one or more two-dimensional positions of the depictions of the one or more visible physical features in the two-dimensional video content. The comparison between the one or more three-dimensional positions, two-dimensional position, and/or other positions may be used to determine the camera position in the three-dimensional space. The comparison may include one or more of a geometric calculation to determine two-dimensional distances in a three-dimensional coordinate system, and/or other calculations. In some implementations, calculations and/or extrapolations of camera position may occur for multiple frames of the two-dimensional video content. The multiple calculations and/or extrapolation of the camera position may determine a function of the camera position that is dependent on the progress through the video content and/or frame number of the two-dimensional video content. In some implementations, the camera position and/or function of camera position may be predetermined and/or obtained from the user.

Integration component 114 may be configured to identify a presentation location within the two-dimensional video content. The presentation location may have a surface in the three-dimensional space suitable for presentation of supplemental visual content. In some implementations, the presentation locations may be identified in real-time or near real-time during the determination of content placement in the two-dimensional video content. The presentation locations may be identified subsequent to obtaining the model of the three-dimensional space, such that the obtained model may be analyzed for one or more suitable presentation locations. Suitable presentation locations may include one or more surfaces of one or more visible physical features, and/or other features and/or objects in the three-dimensional space. The one or more surfaces may be identified as suitable presentation locations based one or more of visibility in the view of the two-dimensional video content, size of the surface, texture of the surface, angle of the surface relative to the camera position, and/or other information. In some implementations, the presentation locations may be predetermined. The presentation locations may be predetermined manually by the user, using one of more external machine learning algorithms, and/or other methods. The predetermined presentation locations may be identified based on the obtained model of the three-dimensional space.

Integration component 114 may be configured to determine integration information for the obtained supplemental visual content. The integration information may be based on the camera position and the identified presentation location. The integration information may include one or more of scaling information, three-dimensional rotational position for the supplemental visual content, and/or other information. In some implementations, the integration information may include the presence of one or more occluding physical features within the three-dimensional space. The occluding physical features may occlude or partially occlude the identified presentation location from the field of view.

Modification component 116 may be configured to modify the two-dimensional video content to include the supplemental visual content. The supplemental visual content may be included in the two-dimensional visual content at the identified presentation locations. Modification of the two-dimensional video content may be in accordance with the integration information. By way of non-limiting example, the supplemental visual content may appear to be present in the two-dimensional video content on the surface of identified presentation location. In some implementations, responsive to the identified presentation location being occluded or partially occluded, modifying the two-dimensional video content may include occluding or partially occluding the supplemental visual content at the identified presentation locations from the field of view. By of non-limiting example, the supplemental visual content may appear to be occluded or partially occluded by the one or more occluding physical features defined by the integration information.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, a physical processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, 114, 116, and/or other components. Processor(s) 130 may be configured to execute components 108, 110, 112, 114, and/or 116, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, and/or 116 are illustrated in FIG. 1 as being implemented within a single processing unit, in implementations in which processor(s) 130 includes multiple processing units, one or more of components 108, 110, 112, 114, and/or 116 may be implemented remotely from the other components. The description of the functionality provided by the different components 108, 110, 112, 114, and/or 116 described in this disclosure is for illustrative purposes, and is not intended to be limiting, as any of components 108, 110, 112, 114, and/or 116 may provide more or less functionality than is described. For example, one or more of components 108, 110, 112, 114, and/or 116 may be eliminated, and some or all of its functionality may be provided by other ones of components 108, 110, 112, 114, and/or 116.

As another example, processor(s) 130 may be configured to execute one or more additional components that may perform some or all of the functionality attributed below to one of components 108, 110, 112, 114, and/or 116.

Figure 3A:
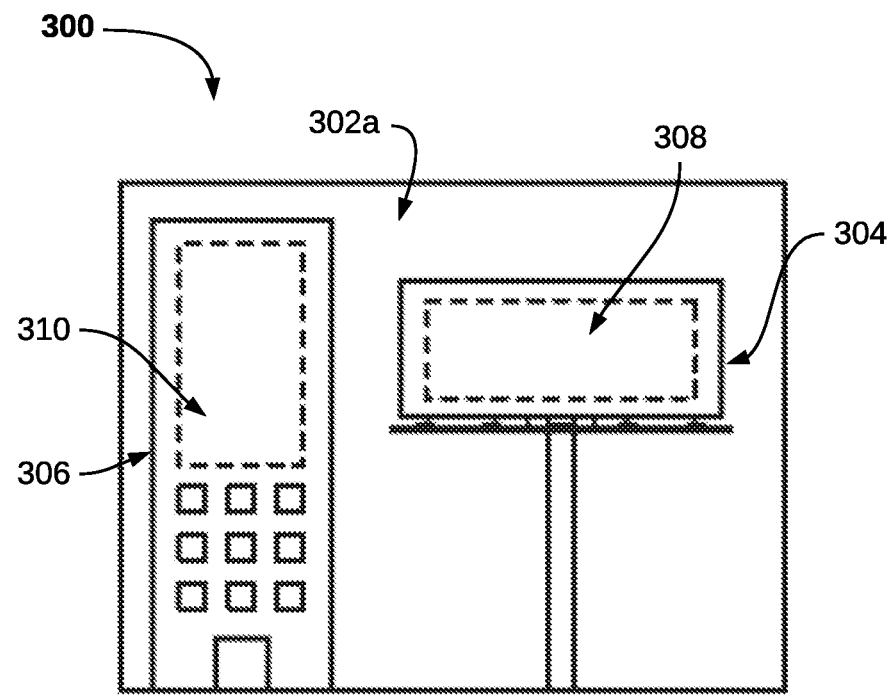
FIG. 3A-3B illustrates an exemplary implementation of a system configured to insert supplemental content into presentations of two-dimensional video content, in accordance with one or more implementations

FIG. 3A illustrates a user interface 300 displaying a view of a frame of two-dimensional video content. Two-dimensional video content may depict a three-dimensional space 302. Three-dimensional space 302 may include one or more of a first visible physical feature 306, a second visible physical feature 304, and/or other visible physical features and/or objects. In some implementations, the visibility of the one or more physical features in the view of the two-dimensional video content may be a function of the progress through the video content. For example, the frame of the two-dimensional video content shown in FIG. 3A may depict different features and/or objects than a second frame at a different point in the progress through the same two-dimensional video content. In some implementations, the view of the two-dimensional video depicting three-dimensional space 302 may be a function of the progress through the two-dimensional video content. For example, a first frame of the two-dimensional video content may present a first view of three-dimensional space 302. A second frame of the two-dimensional video content may present a second view of three-dimensional space 302. The first view and the second view may be the same or different and/or depend on the progression through the two-dimensional video content. The two-dimensional video content may include a number of frames that is based on the length of the video content and/or the rate of frames per second (FPS). In some implementation, the two-dimensional video content may have a rate of FPS of 16 FPS, 24 FPS, 30 FPS, 60 FPS, and/or other rates of FPS.

Referring to FIG. 3A, first visible physical feature 306 may include a surface 310 and/or other features and/or components. In some implementations, surface 310 may be in the view of the two-dimensional video content and/or partially in the view of the two-dimensional video content. First visible physical feature 306 may be a stationary feature, a mobile feature, and/or other type of features. By way of non-limiting example, first visible physical feature 306 is depicted as a building in the two-dimensional video content. Second visible physical feature 304 may include a surface 304 and/or other features and/or components. In some implementations, surface 304 may be in the view of the two-dimensional video content and/or partially in the view of the two-dimensional video content. Second visible physical feature 304 may be a stationary feature, a mobile feature, and/or other type of features. By way of non-limiting example, first visible physical feature 306 is depicted as a billboard and/or sign in the two-dimensional video content. Visibility of first visible physical feature 306, second visible physical feature 304, and/or other physical features may be a function of the progress through the two-dimensional video content. By way of non-limiting example, first visible physical feature 306 is fully visible in a first frame of the video content. First visible physical feature 306 may be fully visible, partially visible, or not shown in a second frame of the two-dimensional video content, the first frame being different from the second frame.

FIG. 4 illustrates a representation of a model 400. Model 400 may be based on and/or a representation of the three-dimensional space 302 depicted in the two-dimensional video content, which is the same as or similar to the three-dimensional space 302 depicted in the two-dimensional video content in FIG. 3A. Model 400 may define one or more of first visible physical feature 306, second visible physical feature 304, and/or other physical features and/or objects present in three-dimensional space 302. In some implementations, the one or more physical features and/or objects define by model 400 may be determined by physical features and/or objects in the view of the two-dimensional video content. For example, the two-dimensional video content may depict a three-dimensional space, however some objects in the three-dimensional space may not be presented in the view throughout the progression of the two-dimensional video content. Objects not presented in the view may not be included in the model of the three-dimensional space. In some implementations, model 400 may be based on and/or a representation of the two-dimensional video content and/or other videos depicting the same three-dimensional space. For example, model 400 may include one or more physical features and/or object that are not presented in the view throughout the progression of the two-dimensional video content. The one or more physical features and/or object may be presented in the view through the progression of the other videos depicting the same three-dimensional space that model 400 is based on.

Referring to FIG. 4, in some implementations, model 400 may include a camera position 402 (represented herein as a camera icon), a field of view (represented herein by dashed lines extending from the camera icon), and/or other features and/or objects. In some implementations, camera position 402 may change based on the progression through the video content. For example, camera position 402 is based on the view of the frame of the video content depicted in FIG. 3A. Camera position 402 may change based on the view of the three-dimensional space as the video content progresses. Camera position 402 may be determined by comparing the depiction of the one or more visible features in the two-dimensional video content with the one or more visible features defined in model 400. In some implementations, a change in camera position 402 may result in a change of the field of view. In some implementations, model 400 may have one or more different defined camera positions. The one or more camera positions may correspond to one or more different frames of the two-dimensional video content. By way of non-limiting example, a first camera position may correspond to a first frame of the two-dimensional video content, a second camera position may correspond to a second frame of the two-dimensional video content, a third camera position may correspond to a third frame of the two-dimensional video content, and so on and so forth. In some implementations, field of view 404 may define the area of three-dimensional space 302 that is observable to the viewer of the two-dimensional video content depicting three-dimensional space 302.

Referring to FIG. 4, model 400 may include and/or be used to identify one or more presentation locations within the three-dimensional space. Model 400 may define first surface 310 on first visible physical feature 306, second surface 308 on first visible physical feature 304, and/or other surfaces present in the two-dimensional video content and/or other videos. In some implementations, surfaces of model 400 may include ground planes, aerial surfaces, and/or other types of surfaces. First surface, second surface 308, and/or other surfaces may be identified as a presentation location in the three-dimensional space. In some implementations, presentation location may be identified and/or determined based on one or more of visibility in field of view 404, presence of one or more occluding physical features, surface texture, surface size, and/or other information. By way of non-limiting example, first surface 310 and second surface 308 may be within field of view 404 and may not be occluded by any occluding physical features. In some implementations, model 400 may be used and/or analyzed to determine integration information and/or other information. Model 400 may be analyzed manually by the user, by one or more machine learning algorithms, and/or other methods to determine integration information and/or other information. Integration information may be determined for supplemental visual content subsequent to the identification of one or more presentation locations in model 400. Integration information may include scaling information, three-dimensional rotation information, color readjustment information, and/or other information. In some implementations, integration information may be based on model 400, the visible physical features defined in model 400, obtained supplemental visual content, and/or other information and/or content.

Figure 3B:
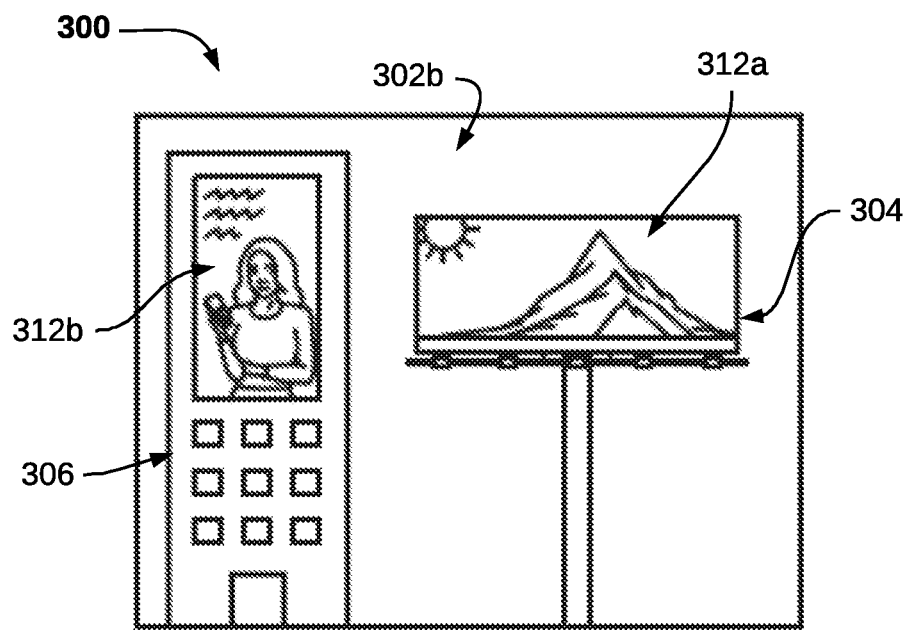

FIG. 3B illustrates user interface 300 displaying a view of a frame of two-dimensional video content subsequent to being modified to include supplemental visual content. Two-dimensional video content may depict a three-dimensional space 302, which may be the same as or similar to the three-dimensional space depicted in FIG. 3A. The two-dimensional video content may depict one or more of first visual physical feature 306, second visible physical feature 304, and/or other features and/or objects. Two-dimensional video content may also include first supplemental visual content 312a, a second supplemental visual content 312b, and/or other content. In some implementations, modification of the two-dimensional video content may include the addition of first supplemental visual content 312a in one or more identified presentation locations. By way of non-limiting example, first supplemental visual content 312a may be included in the two-dimensional video content and may appear to be presented on the first surface 310 of first visible physical feature 306, responsive to surface 310 being identified as a suitable presentation location. First supplemental visual content 312a may be included in the two-dimensional video content in accordance with the determined integration information. By way of non-limiting example, first supplemental visual content 312a may have been scaled up or scaled down, such that first supplemental visual content 312a may fit within first surface 310 (indicated by the dashed box in FIG. 3A). First supplemental visual content 312a may have been rotated in accordance with three-dimensional rotation information, such that first supplemental visual content information may appear to be attached and/or lay flat on first surface 310.

In some implementations, modification of the two-dimensional video content may include the addition of second supplemental visual content 312b in one or more identified presentation locations. By way of non-limiting example, second supplemental visual content 312b may be included in the two-dimensional video content and may appear to be presented on the second surface 308 of second visible physical feature 304, responsive to surface 308 being identified as a suitable presentation location. Second supplemental visual content 312b may be included in the two-dimensional video content in accordance with the determined integration information. By way of non-limiting example, second supplemental visual content 312b may have been scaled up or scaled down, such that second supplemental visual content 312b may fit within second surface 308 (indicated by the dashed box in FIG. 3A). Second supplemental visual content 312b may have been rotated in accordance with three-dimensional rotation information, such that second supplemental visual content information may appear to be attached and/or lay flat on second surface 308. In some implementations, modification of the two-dimensional video content may occur for individual ones of frames included in the two-dimension video content, such that three-dimensional space 302 may appear to include one or more supplemental visual content in the one or more presentation locations throughout the progression of the two-dimensional video content.

Figure 2:
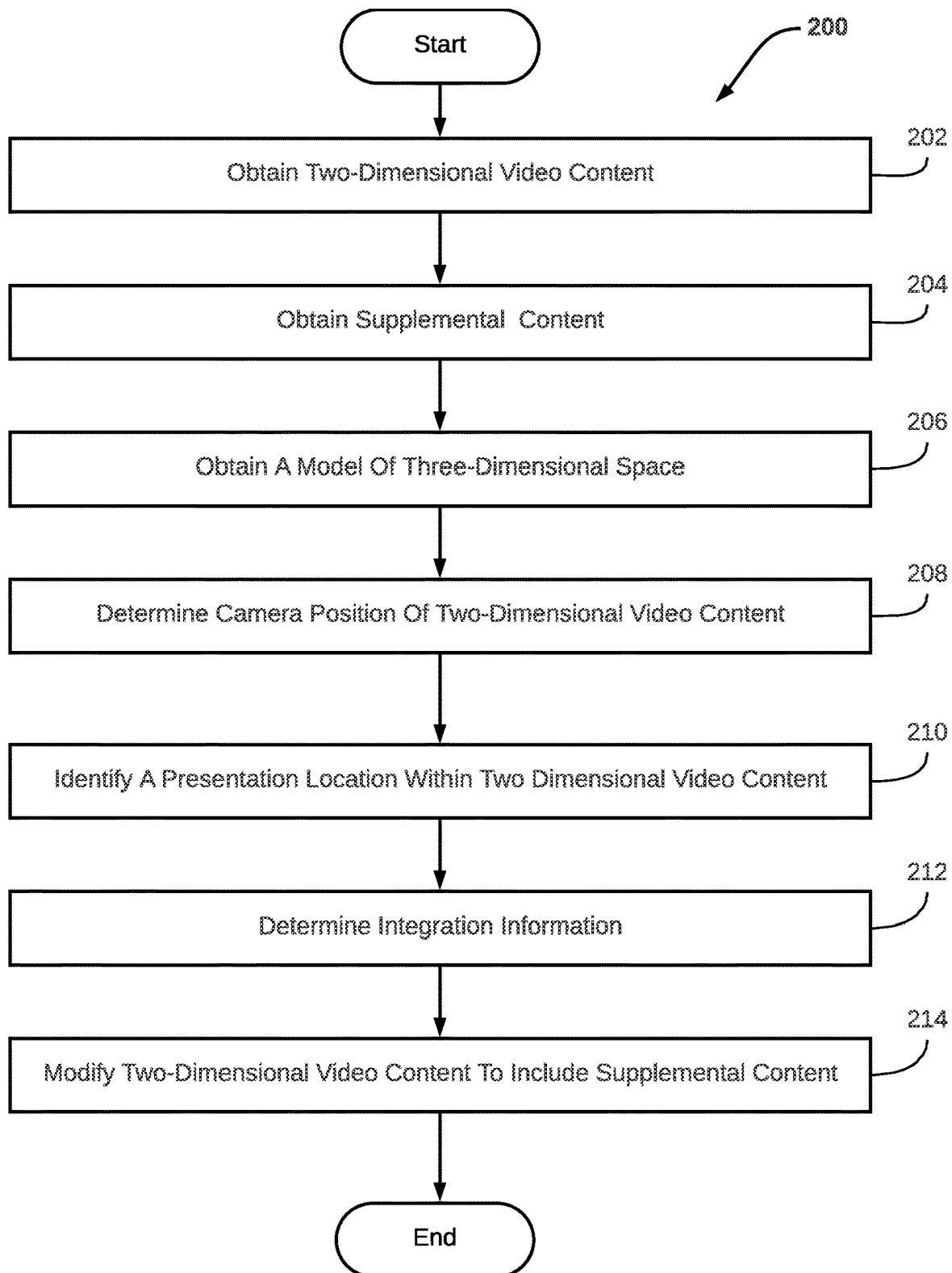
FIG. 2 illustrates a method for inserting supplemental content into presentations of two-dimensional video content, in accordance with one or more implementations.

FIG. 2 illustrates a method 200 for inserting supplemental content into presentations of two-dimensional video content, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may obtaining two-dimensional video content. The two-dimensional video content may depict a view of a three-dimensional space. The view of the three-dimensional space may include one or more visible physical features and/or other features. A field of view of the view of the three-dimensional space may be defined by a camera position. The camera position may include one or more of a point of view, a capture angle and/or other information. In some embodiments, operation 202 is performed by a content component the same as or similar to content component 108 (shown in FIG. 1 and described herein).

An operation 204 may include obtaining supplemental visual content to be inserted into the two-dimensional video content. In some embodiments, operation 204 is performed by a content component the same as or similar to content component 108 (shown in FIG. 1 and described herein).

An operation 206 may include obtaining a model of the three-dimensional space. The model may define the one or more visible physical features within the three-dimensional space. In some embodiments, operation 206 is performed by a model component the same as or similar to model component 110 (shown in FIG. 1 and described herein).

An operation 208 determining the camera position of the two-dimensional video content. Determination of the camera position may be done by comparing the depiction of the one or more visible features in the two-dimensional video content with the one or more one or more visible features defined in the model. The comparison may be used to extrapolate the camera position. In some embodiments, operation 208 is performed by a camera component the same as or similar to camera component 112 (shown in FIG. 1 and described herein).

An operation 210 may include identifying a presentation location within the two-dimensional video content. The presentation location may have a surface in the three-dimensional space suitable for presentation of supplemental visual content. In some embodiments, operation 210 is performed by an integration component the same as or similar to integration component 114 (shown in FIG. 1 and described herein).

An operation 212 may include determining integration information for the supplemental visual content. The integration information may be based on one or more of the camera position, the identified presentation location, and/or other information. The integration information may include scaling information, three-dimensional rotational position for the supplemental visual content, and/or other information. In some embodiments, operation 212 is performed by an integration component the same as or similar to integration component 114 (shown in FIG. 1 and described herein).

An operation 214 may include modifying the two-dimensional video content to include the supplemental visual content. The supplemental visual content may be included in the two-dimensional video content at the identified presentation locations. Modification of the two-dimensional video content may be in accordance with the integration information. By way of non=limiting example, the supplemental visual content may appear to be present in the two-dimensional video content on the surface of identified presentation location. In some embodiments, operation 214 is performed by a modification component the same as or similar to modification component 116 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to insert supplemental content into presentations of two-dimensional video content, the system comprising:
   one or more processors configured by machine readable instructions to:
      obtain two-dimensional video content from a source server, wherein the two-dimensional video content depicts a whole or partial view of a three-dimensional space, wherein the view of the three-dimensional space includes one or more visible physical features, and wherein a field of view of the view of the three-dimensional space is defined by a camera position that includes a point of view and a capture angle;
      obtain supplemental content to be inserted into the two-dimensional video content;
      obtain a model of the three-dimensional space that defines the one or more visible physical features and aerial space within the three-dimensional space;
      determine the camera position of the two-dimensional video content by comparing the two-dimensional video content with the model, and using the comparison to extrapolate the camera position, wherein the camera position changes as a function of progress through the two-dimensional video content;
      identify a presentation location in the two-dimensional video content, the presentation location being suitable for presentation of supplemental content, wherein the presentation location is a surface of the one or more visible features or a portion of aerial space within the three-dimensional space;

determine integration information for the supplemental content based on one or more of the camera position, the identified presentation location, and the obtained supplement content, the integration information including scaling information and three-dimensional rotational position for the supplemental content; and modify the two-dimensional video content to include the supplemental content at the identified presentation locations in accordance with the integration information.

2. The system of claim 1, wherein the integration information includes the presence of one or more occluding physical features within the three-dimensional space that occludes or partially occludes the identified presentation location from the field of view.

3. The system of claim 2, wherein, responsive to the identified presentation location being occluded or partially occluded, modifying the two-dimensional video content to include occluding or partially occluding the supplemental content at the identified presentation locations from the field of view, such that the supplemental content appears to be occluded or partially occluded by the one or more occluding physical features defined by the integration information.

4. The system of claim 1, wherein the model of the three-dimensional space is obtained from a machine learning algorithm, wherein the machine learning algorithm is stored using electronic storage, and wherein the machine learning algorithm uses the two-dimensional video content to generate the model of the three-dimensional space.

5. The system of claim 1, wherein the model of the three-dimensional space is obtained from the user, and wherein the model of the three-dimensional space is predetermined prior to being obtained, and wherein the model of the three-dimensional space is based on the two-dimensional video content.

6. The system of claim 1, wherein the model of the three-dimensional space is predetermined prior to be being obtained, and wherein the model is based on one or more of secondary video content, wherein individual ones of the secondary video content depicts the same three-dimensional space as the obtained two-dimensional video content.

7. The system of claim 1, wherein the supplemental content includes image content, video content, and text content.

8. The system of claim 1, wherein the presentation locations are identified in real-time and subsequent to obtaining the model of the three-dimensional space.

9. The system of claim 1, wherein the presentation locations are predetermined, and wherein the predetermined presentation locations are identified based on the model of the three-dimensional space.

10. The system of claim 1, wherein supplemental content is inserted into presentations of the two-dimensional video content during streaming of the two-dimensional video content form a source server to a destination server.

11. A method for inserting supplemental content into presentations of two-dimensional video content, the method comprising:

obtaining two-dimensional video content from a source server, wherein the two-dimensional video content depicts a whole or partial view of a three-dimensional space, wherein the view of the three-dimensional space includes one or more visible physical features, and wherein a field of view of the view of the three-dimensional space is defined by a camera position that includes a point of view and a capture angle;

obtaining supplemental content to be inserted into the two-dimensional video content;

obtaining a model of the three-dimensional space that defines the one or more visible physical features and aerial space within the three-dimensional space;

determining the camera position of the two-dimensional video content by comparing the two-dimensional video content with the model, and using the comparison to extrapolate the camera position, wherein the camera position changes as a function of progress through the two-dimensional video content;

identifying a presentation location in the two-dimensional video content, the presentation location being suitable for presentation of supplemental content, wherein the presentation location is a surface of the one or more visible features or a portion of aerial space within the three-dimensional space;

determining integration information for the supplemental content based on one or more of the camera position, the identified presentation location, and the obtained supplement content, the integration information including scaling information and three-dimensional rotational position for the supplemental content; and modifying the two-dimensional video content to include the supplemental content at the identified presentation locations in accordance with the integration information.

12. The method of claim 11, wherein the integration information includes the presence of one or more occluding physical features within the three-dimensional space that occludes or partially occludes the identified presentation location from the field of view.

13. The method of claim 12, wherein, responsive to the identified presentation location being occluded or partially occluded, modifying the two-dimensional video content to include occluding or partially occluding the supplemental content at the identified presentation locations from the field of view, such that the supplemental content appears to be occluded or partially occluded by the one or more occluding physical features defined by the integration information.

14. The method of claim 11, wherein the model of the three-dimensional space is obtained from a machine learning algorithm, wherein the machine learning algorithm is stored using electronic storage, and wherein the machine learning algorithm uses the two-dimensional video content to generate the model of the three-dimensional space.

15. The method of claim 11, wherein the model of the three-dimensional space is obtained from the user, and wherein the model of the three-dimensional space is predetermined prior to being obtained, and wherein the model of the three-dimensional space is based on the two-dimensional video content.

16. The method of claim 11, wherein the model of the three-dimensional space is predetermined prior to be being obtained, and wherein the model is based on one or more of secondary video content, wherein individual ones of the secondary video content depicts the same three-dimensional space as the obtained two-dimensional video content.

17. The method of claim 11, wherein the supplemental content includes image content, video content, and text content.

18. The method of claim 11, wherein the presentation locations are identified in real-time and subsequent to obtaining the model of the three-dimensional space.

19. The method of claim 11, wherein the presentation locations are predetermined, and wherein the predetermined presentation locations are identified based on the model of the three-dimensional space.

20. The method of claim 11, wherein supplemental content is inserted into presentations of the two-dimensional video content during streaming of the two-dimensional video content form a source server to a destination server.

* * * * *